US 8,249,066 B2

(12) United States Patent
Mielich

(10) Patent No.: US 8,249,066 B2
(45) Date of Patent: Aug. 21, 2012

(54) APPARATUS AND METHOD FOR ALLOCATING MEDIA RESOURCES

(75) Inventor: Rainer Mielich, Keltern (DE)

(73) Assignee: Dialogic Corporation, Montreal (CA)

( * ) Notice: Subject to any disclaimer, the term of this patent is extended or adjusted under 35 U.S.C. 154(b) by 1220 days.

(21) Appl. No.: 12/070,508

(22) Filed: Feb. 19, 2008

(65) Prior Publication Data

US 2009/0207837 A1 Aug. 20, 2009

(51) Int. Cl.
*H04L 12/28* (2006.01)
(52) U.S. Cl. ......................................... 370/389
(58) Field of Classification Search .................. None
See application file for complete search history.

(56) References Cited

U.S. PATENT DOCUMENTS

| | | | |
|---|---|---|---|
| 5,008,926 A | 4/1991 | Misholi | |
| 5,159,592 A | 10/1992 | Perkins | |
| 5,410,691 A | 4/1995 | Taylor | |
| 5,577,250 A * | 11/1996 | Anderson et al. | 718/100 |
| 5,764,747 A | 6/1998 | Yue et al. | |
| 5,931,917 A | 8/1999 | Nguyen et al. | |
| 5,983,350 A | 11/1999 | Minear et al. | |
| 5,987,578 A | 11/1999 | Butcher | |
| 6,044,445 A | 3/2000 | Tsuda et al. | |
| 6,154,465 A | 11/2000 | Pickett | |
| 6,240,086 B1 * | 5/2001 | Morgan et al. | 370/352 |
| 6,295,276 B1 | 9/2001 | Datta et al. | |
| 6,324,263 B1 | 11/2001 | Sherwood et al. | |
| 6,353,886 B1 | 3/2002 | Howard et al. | |
| 6,708,233 B1 | 3/2004 | Fuller et al. | |
| 6,768,901 B1 * | 7/2004 | Osborn et al. | 455/230 |
| 6,810,470 B1 | 10/2004 | Wiseman et al. | |
| 6,873,689 B1 | 3/2005 | Butler et al. | |
| 7,050,807 B1 * | 5/2006 | Osborn | 455/445 |
| 2003/0126183 A1 | 7/2003 | Wu et al. | |
| 2004/0203937 A1 * | 10/2004 | Mauro, II | 455/464 |
| 2005/0129061 A1 | 6/2005 | Sligo et al. | |

FOREIGN PATENT DOCUMENTS

| | | |
|---|---|---|
| EP | 0 483 547 A1 | 5/1992 |
| EP | 0 513 484 A2 | 11/1992 |
| EP | 1126685 A2 | 8/2001 |
| EP | 1 560 409 A2 | 8/2005 |
| GB | 2325121 A | 11/1998 |
| GB | 2325122 A | 11/1998 |
| GB | 2351869 | 1/2001 |
| JP | 61123970 | 6/1986 |
| WO | WO-96/05681 A1 | 2/1996 |

OTHER PUBLICATIONS

Faye McClenahan-Aculab, Internet Telephony Conference & Expo, Jan. 23-26, 2007, IP Communications Authority, All Pages.*
International Search Report (PCT/ISA/210).
Partial European Search Report in Application No. EP 05 25 0528 dated Jan. 28, 2008.

(Continued)

*Primary Examiner* — Otis L Thompson, Jr.
(74) *Attorney, Agent, or Firm* — Edwards Wildman Palmer LLP; George N. Chaclas

(57) ABSTRACT

A Media Resource Routing module for a VoIP network having a Host Media Processing and a Media Resource Board. The Media Resource Routing module includes a status list module indicating available resources of the Host Media Processing and available channels on the Media Resource Board and switches for routing communications based on data in the status list so that resources are used efficiently.

16 Claims, 5 Drawing Sheets

OTHER PUBLICATIONS

Partial European Search Report dated Mar. 23, 2007 in Application No. EP 06 25 6168.
European Search Report dated Jun. 1, 2005.
Voiceboard: "PICMG 2.16 Compatible CS3X Superspan Dual/Quad/Octal Software Selectable T1/J1/E1 Network Interface" [Online] 2004.
Intel: "Intel NetStructure SS7HDP Board" {Online] Apr. 2004.
Eicon Networks Corporation: "Diva Server BRI" [Online] 2004.
Grigonis, R: "CT Resource Boards", Computer Telephony Encyclopedia, New York : CMP Books, US, 2000, pp. 132-133.
Grigonis, R: "CompactPCI", Computer Telephony Encyclopedia, New York : CMP Books, US, 2000, pp. 87-110.
Eicon Networks Corporation: "Diva Server SDK" [Online] 2005.
Eicon Networks Corporation: "Diva Server SoftSS7" [Online] 2005.
Eicon Networks Corporation: "Diva Server SoftIP" [Online] 2006.

* cited by examiner

APPARATUS AND METHOD FOR ALLOCATING MEDIA RESOURCES

BACKGROUND OF THE INVENTION

1. Field of the Invention

The present technology relates to video, voice, modem and FAX processing systems and more particularly to how such systems allocate required media resources and the related processing power. The subject disclosure also relates to media resource boards and Host Media Processing (HMP) implementations and to the scalable, automatic usage of the combination of both components within one computer.

2. Background of the Related Art

In the modern world of telecommunications, people make phone calls to connect with each other. Phone devices typically are connected to a telephone exchange (also called a "switch"), whereas multiple public telephone exchanges are connected through a worldwide network, also known as the Public Switched Telephone Network (PSTN). Traditionally, telephone exchanges were owned, operated and located at public carriers only, and served companies and private persons. Calls using the PSTN generated phone charges, so in order to avoid such charges, business began to have privately owned local switches, such as a Private Branch eXchange (PBX), but also known as a Private Automatic Branch eXchange (PABX).

Various locations of a company can be interconnected by a dedicated line, such as a trunk line, so that the PBX can encompass the entire company. Users of the PBX share a certain number of outside lines for making and receiving telephone calls external to the PBX. The PBX performs a variety of functions, such as establishing and maintaining connections or circuits between the telephones of two users. Facsimile machines, communication modems, conferencing systems and other communication devices can be connected to the PBX as desired. The PBX also provides other features such as usage information for accounting purposes, speed dialling, call forwarding, music on hold and the like.

Another important medium of the modern communication is the well known, so-called "Internet." The Internet transports data by using packets. The modern Internet is also hosted by public carriers, but the cost of Internet connectivity is relatively small compared to that of a public phone line. The data network that connects to the Internet could be a Local Area Network (LAN), a wide area network (WAN), and combinations thereof as is well known.

Since companies have begun to access phone lines and the Internet, two separate networks must be maintained by such companies. For cost saving reasons, it has become advantageous to replace the traditional phone system by an Internet-based system to eliminate the need for separate networks. To make phone calls over the Internet, voice and data are transported using the Internet Protocol (IP). Thus, not only can the PBX be eliminated, but the related network and maintenance costs can be as well.

Transporting phone calls over an IP network is commonly known as Voice over Internet Protocol (VoIP). In a VoIP system, computers, IP telephones and like devices (e.g., endpoints) are connected to an IP network. The voice data of such phone calls over the IP network is typically transferred with a specific Real Time Protocol (RTP). To reduce the required bandwidth of such voice RTP data streams, it is common to use voice compression and conversion algorithms known as CODEC (e.g., the Adaptive Differential Pulse Code Modulation ADPCM G.726 (ITU-T)). If the application is developed to run with a different voice data format than what is used at the IP network, a conversion called "transcoding" occurs. The endpoints of the IP network have a network card, such as an Ethernet card, for transporting data and the telephone calls. Such Ethernet cards are often located in a general purpose personal computer (PC).

To accommodate the many features of legacy telephone networks, applications, like Interactive Voice Response Systems (IVR) or Unified Messaging Servers (UMS), are using methods to detect and generate different tones (e.g., DTMF or generic tone detector, busy tone detector and the like), Voice Activity Detector (VAD), different modulations like Modem or Fax, Real Time Protocol (RTP), Echo Canceller, transcoding and voice compression. In order to process these different media, via what is referred to as Media Processing, additional applications are being developed. Often the communication drivers are purely software applications running at the endpoint since the legacy communication adapter does not need to be present in systems running VoIP. This arrangement is known as Host Media Processing (HMP). In other words, HMP is sophisticated software that manages applications and low-level hardware, as well as software technology housekeeping and coordination tasks.

For larger systems, such as those where many channels need to be processed, personal computer performance is often undesirably slow or intermittent. To enhance performance, it is common to add Media Resource Boards or communication adapters providing Digital Signal Processor (DSP) power to the application. The term media resource board, as used herein, also refers to a Digital Signal Processor (DSP) resource board, a DSP offload board or a DSP blade. In circumstances of hybrid installations (i.e., a system having HMP software and legacy communication adapters with DSP resources), or in circumstances where a Media Resource Board adds scalability to an HMP installation, the resources are typically allocated in a fixed manner, so that the specific media resources are handled by the Media Resource Board only (or the legacy communication adapter with DSP capabilities) if present in the system. As a result, if a system must serve a specific number of media streams with specific DSP processing power (e.g., FAX transcoding), all of it must be performed by the DSP board, leaving the host processor mostly unused for such a specific task, even if the host processor would be free and able to take over portions of such media processing tasks.

In other use cases, the HMP software might have sufficient power to serve all the media processing tasks running a mixture of different media resources (e.g., T.38 Fax, Clear Channel Fax and/or Modem, different voice compression codecs, etc.). All the different media resources consume different processor performance at the host processor—some very little (like ITU-T G.711), some a great deal (like V.34 Clear Channel Fax), and some moderate (like ITU-T G.729). As a result, it is difficult to predict the number of channels available in a HMP system because the availability depends highly on the usage of the media resource type mixture. If, in addition, another application is running in the same system and consuming host processing power, it may happen that all HMP channels are running out of performance resulting in VoIP dropouts and related media problems.

Referring to FIG. 1, a high level view of an IP Media Server 200 is shown. Such an IP Media Server 200 would be used to make connections in a telecommunications system environment (not shown). The IP Media Server 200 includes media streaming. The IP Media Server 200 basically includes applications 201, Host Media Processing (HMP) software 202 and, for high performance tasks, DSP offload functions within the installed Media Resource Board 203. The IP Media Server 200 only has DSP offload capabilities that are predefined in a fixed manner as noted above. If a media stream comes into the HMP software 202, the IP Media Server 200 decides, based on the characteristics of the media stream, whether to loop the RTP voice data through the Media Resource Board or not, regardless of available CPU power and without stream rerouting capabilities. It may also be that, with the Media Resource Board 203 present, all the data is always passed through the Media Resource Board 203 regardless of the characteristics of the media stream. Accordingly, processing power for the IP Media Server 200 is available but not utilized.

SUMMARY OF THE INVENTION

There is a need, therefore, for an improved IP Media Server which permits distributing or routing media resources in a flexible, automatic arrangement so that the media resources can be efficiently utilized. In one aspect, the improved module allows a specific media resource type (e.g., G.729) to be processed at the host processor while another media resource type (e.g., Clear Channel Fax) always runs on the Media Resource Board. A software module determines the media routing based on where the specific required feature is located. As a result, low performance tasks can route through the host with many channels (e.g., voice), while high performance tasks are routed through the Media Resource Board (e.g., Fax).

In one method, the subject technology allows using inactive DSP-enabled channels of the Resource Board for non-DSP related calls (e.g., voice) if all available channels of the HMP software are used or the host performance is exhausted. Further, the user may reserve some or all Media Resource Board resources for DSP dedicated usage only (e.g., Clear Channel Fax or Modem) to prevent all channels available in the system being busy, such as with voice, as well as enabling DSP switchover (e.g., switchover from voice to Clear Channel Fax), which would otherwise not be possible.

During the lifetime of a call, the call characteristic may change (e.g., a detected Fax tone in voice mode would indicate that Fax resources are required) and therefore require a switchover of the media stream from a HMP module to a Media Resource Board resource, and vice versa. In this case, a routing software module removes the stream from the HMP module and internally re-routes the media stream through the Media Resource Board. As is currently preferred, the routing software module can do the media routing decision based on the remaining host processor performance left in the system. If the host processing power is above a certain criteria (e.g., 60% of the total CPU performance is used) and enough channels are free at the Media Resource Board, the routing software module may decide to re-route specific media streams with the highest CPU consumption (e.g., transcoding tasks) from the host towards the Media Resource Board. If "live" re-routing is not possible, the re-routing module may just use the Media Resource Board with the next new media stream(s) to save the remaining CPU processing power.

As is current preferred, the re-routing feature is transparent to the external interfaces like IP sockets and native interfaces (e.g., Application Programming Interfaces (APIs)). The automatic media resource allocation is fully abstracted within the product's internal interfaces, and all resources are managed automatically within the product driver architecture.

Each media processing feature may have a performance characteristic associated therewith in order to calculate the expected CPU performance if the specific resource is used. Because each computer is different, in host-based systems, the performance value can be a relative performance factor only, while during initialization or during the first usage of a specific resource, the relative factor can be calculated according to the real performance of the actual used host system.

The automatic media resource allocation (or the media stream routing) is based on decisions done at the media routing module. Depending on the overall system requirements, the criteria can be configurable per product configuration, if necessary. If nothing is configured (or configurable), system defaults apply (e.g., typical maximal CPU performance, route high performance streams like Fax or Modem through the Media Resource Board).

In one aspect, the subject technology is a Media Resource Routing module in communication with a Media Streaming module for controlling external interfaces and a Media Resource Board. The Media Resource Routing module includes a status list module indicating available resources of the Host Media Processing and available channels on the Media Resource Board and switches for routing communications based on data in the status list. Further, the Media Resource Routing module may include a priority list for determining an order of consumption of the resources and channels and a confirmation module for determining availability of the resources and channels by sending a resource reservation request to the Host Media Processing and Media Resource Board, respectively. The status list may include: i) a location of the resource and channels; ii) a task related performance consumption value, wherein high performance consumption value tasks are run on the Media Resource Board while low performance consumption tasks are run at the Host Media Processing; iii) remaining Host Media Processing CPU capacity; and v) a number of available resources at the Host Media Processing and at the Media Resource Board. During a call, a call characteristic may change and, in turn, the switches would reroute the call from the Host Media Processor to the Media Resource Board and vice versa.

In another aspect, the subject technology is directed to a server for facilitating communication connections in a system, wherein the server allocates resources to allow communication with endpoints via Internet protocol (IP) sockets. The server includes: (a) at least one Media Resource Board for handling media streams; (b) a memory storing instruction sets for Host Media Processing and data related to a plurality of application modules; and (c) a host processor for running the instruction set, the host processor being in communication with the memory and the at least one Media Resource Board, wherein the host processor is operative to: (i) run the plurality of application modules for operating instruction sets associated with respective protocols; (ii) run a Host Media Processing software module for hardware and software technology housekeeping and coordination tasks, and abstracting a pool of channels; and (iii) run a Media Resource Routing module for selectively allocating resources of the at least one Media Resource Board and the Host Media Processing software module to efficiently route communication to endpoints. Further, if a call characteristic changes during the call, the Media Resource Routing module automatically reroutes the call so that available resources are efficiently used.

The subject technology also includes a method for utilizing resources in a media communication system, the communication system having a Media Resource Routing module for controlling communication to a Host Media Processing and a Media Resource Board, the method comprising the steps of: receiving a signal to establish a media stream; determining a routing of the media stream based on data in the signal, wherein the Media Resource Routing module selects the routing from using the Host Media Processing or the Media Resource Board; and establishing the media stream according to the routing. The media stream may be a facsimile and if the Host Media Processing has insufficient resources to handle the media stream, the Media Resource Routing module establishes the media stream using the Media Resource Board. The media communication system is preferably adapted and configured for use with a voice over Internet protocol (VoIP) system.

Preferably, facsimile resources of the Host Media Processing are configured according to a priority so that the facsimile resources of the Host Media Processing are consumed first, and once facsimile resources of the Media Resource Board are exhausted, the Media Resource Routing module continues to use the facsimile resources at the Media Streaming Processor until a processing power of the Media Streaming Processor reaches a predefined upper limit. The facsimile resources of the Media Resource Board may also be configured according to a priority so that the facsimile resources of the Media Resource Board are consumed first and once facsimile resources of the Media Resource Board are exhausted, the Media Resource Routing module directs future facsimile media streams to the Host Media Processing. The method may further comprise the steps of: routing the signal to the Media Resource Board and if the Media Resource Board internally fails to establish the media stream, rerouting the signal to the Host Media Processing.

It should be appreciated that the present technology can be implemented and utilized in numerous ways, including without limitation as a process, an apparatus, a system, a device, a method for applications now known and later developed or a computer readable medium. Additionally, each claim and features within claims may be rearranged and depend from any other claim in any combination. These and other unique features of the system disclosed herein will become more readily apparent from the following description and the accompanying drawings.

BRIEF DESCRIPTION OF THE DRAWINGS

So that those having ordinary skill in the art to which the disclosed system pertains will more readily understand how to make and use the same, reference may be made to the drawings wherein.

DETAILED DESCRIPTION OF PREFERRED EMBODIMENT

Figure 1:
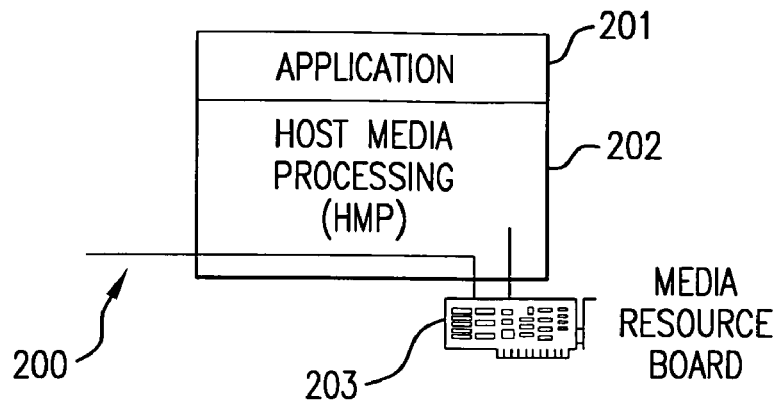
FIG. 1 is an overview of a conventional HMP system, accelerated with a Media Resource Board.

The present technology overcomes many of the prior art problems associated with allocating resources in a telecommunications system. The advantages, and other features of the systems and methods disclosed herein, will become more readily apparent to those having ordinary skill in the art from the following detailed description of certain currently preferred embodiments taken in conjunction with the drawings, which set forth representative embodiments of the present technology and wherein like reference numerals identify similar elements.

Unless otherwise specified, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed systems or methods.

Figure 2:
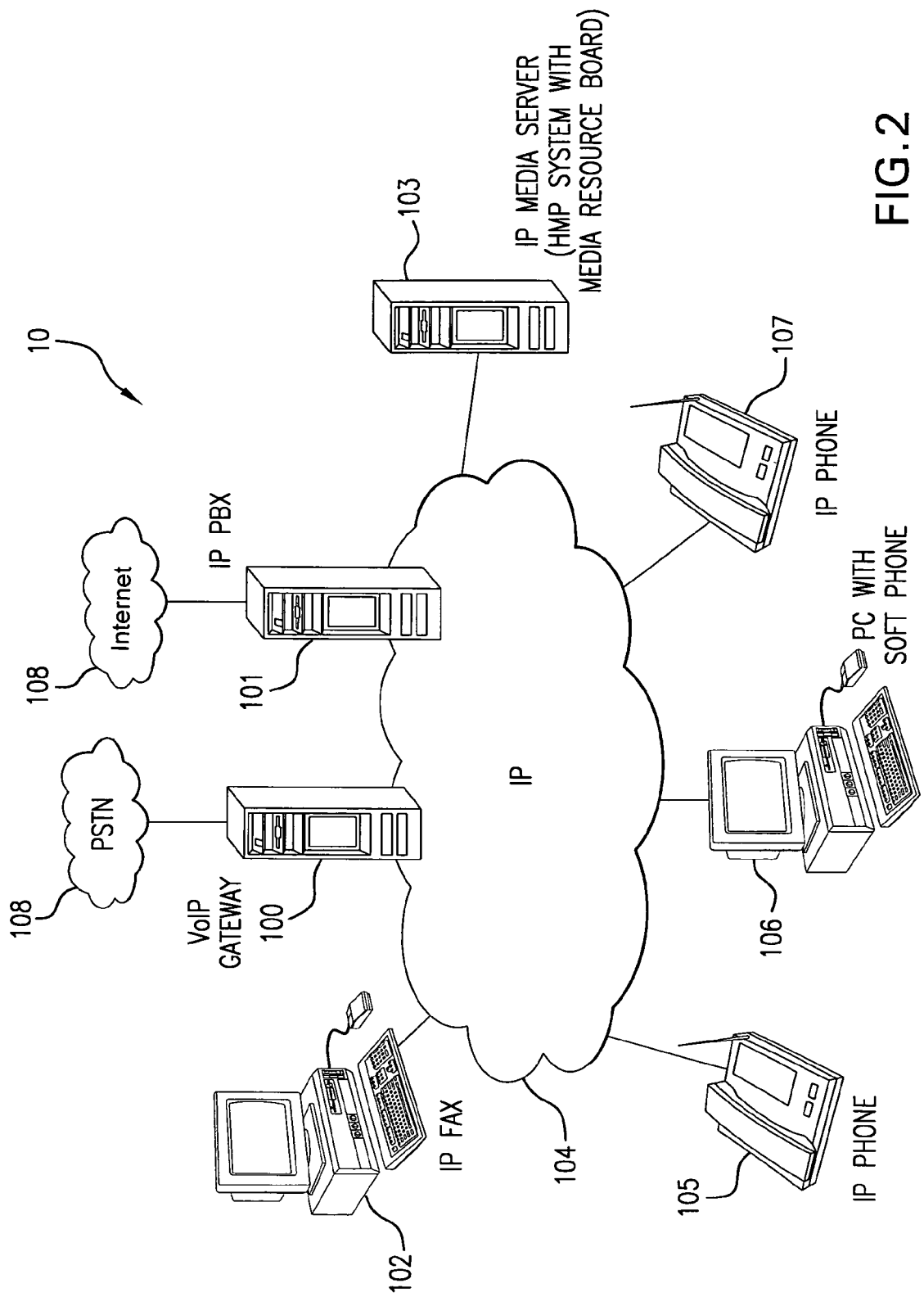
FIG. 2 is an example overview of an environment in the present technology may be used, here as IP Media Server.

Referring to FIG. 2, a high-level view of an Internet protocol (IP)-based environment or communication system 10 including an IP-PBX server 101 and a VoIP gateway server 100 is shown. In one embodiment, the servers 100, 101 are housed in electronics rack(s). The servers 100, 101 include the required software and hardware for a connectivity to networks 108 and to properly operate and communicate through a private (IP-based) network 104 with a plurality of endpoints represented as an IP Fax device 102, an IP Media Server 103, an IP phone 105, a PC including a Soft Phone 106 and other like devices not shown. For simplicity, only one device of an IP Media Server 103, IP phone 105, PC including a Soft Phone 106 is shown; however, it is understood that several hundred or more of each of these could actually be utilized. It is to be appreciated that the technology is shown here within an IP network but it is not limited to such. Although a simplified diagram is illustrated in FIG. 1, such illustration shall not be construed as limiting the present technology to the illustrated embodiment.

It will be appreciated that the term "server," as used herein, refers to the program that is managing the associated resources and that several "servers" may be incorporated within one physical component, or, alternatively multiple components may be coupled to execute a single "server" program in order to accomplish the desired performance. As illustration, the electronics rack for one or more servers typically includes a central processing unit including one or more microprocessors (such as those manufactured by Intel or AMD), random access memory (RAM), mechanisms and structures for performing I/O operations, a storage medium such as a magnetic hard disk drive(s), and an operating system for execution on the central processing unit. The hard disk drive may be used for storing client and server applications, data and the like utilized by various applications.

The communication system 100 includes the IP Media Server 103, which may be housed in a separate electronics rack. The IP Media Server 103 contains memory and additional hardware for storing the software that provides the desired features. As an example of an application, a voicemail module with integrated Fax capability is a common specific application with dedicated hardware that mimics the functions of a Unified Messaging System (e.g., answering machine and Fax) from a centralized location rather than at each endpoint 102, 105, 106, 107. The voicemail module application is only an example of how the IP Media Server 103 may be used, and accordingly the subject technology is not limited to such an application. But for simplicity hereinafter, the mixed voice and Fax usage is used for explanation.

Figure 3:
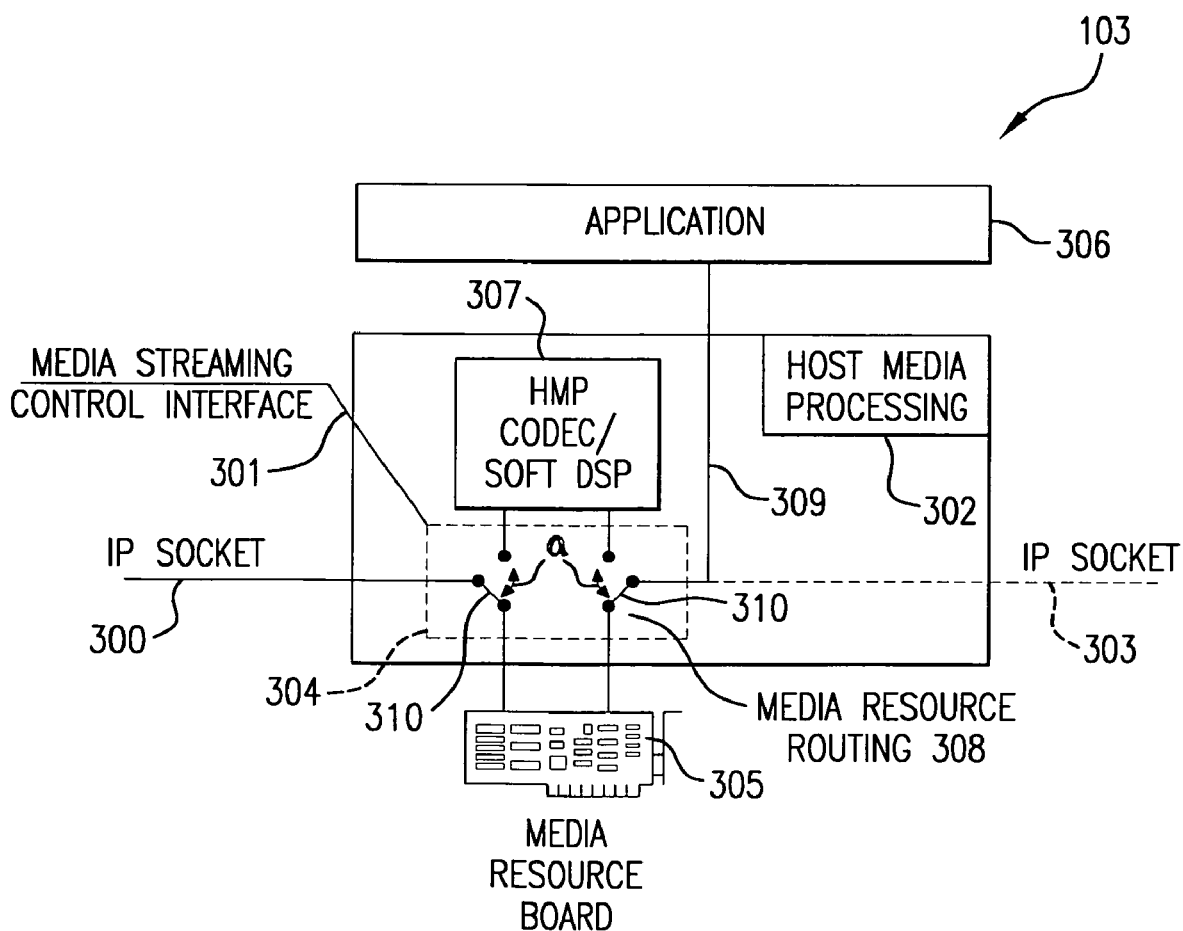
FIG. 3 is an overview of an exemplary HMP system, accelerated with a Media Resource Board using the automatic media resource allocation.

Referring to FIG. 3, a high level view of the IP Media Server 103 is shown. The IP Media Server 103 includes one or more applications 306, one or more Media Resource Boards 305, and Host Media Processing (HMP) software 302.

The HMP software 302 also includes a Media Streaming block 304 having an automatic Media Resource Routing function block 308. The Media Streaming block 304 is controlled by a Media Streaming Control Interface 301. The logic for the automatic Media Resource Routing function block 308 is executed in software to decide whether or not to activate either the host-based (software) media processing capabilities 307 or, as an alternative route, the Media Resource Board (hardware based) DSP capabilities 305 as shown. Communication line 309 connects the selected resource.

Figure 3A:
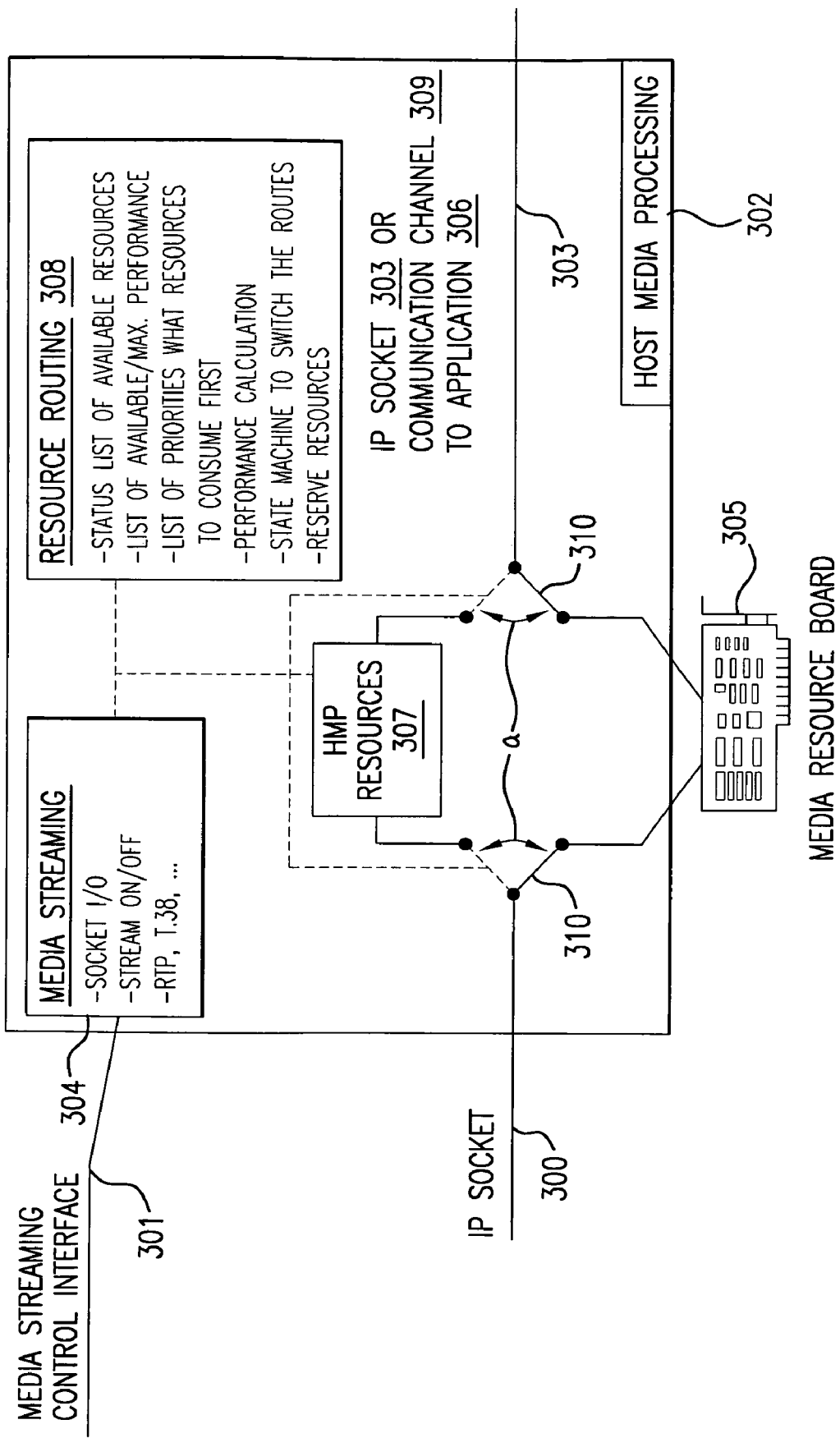
FIG. 3A shows a more detailed view of the media resource routing function block of FIG. 3.

Referring additionally to FIG. 3A, a more detailed view of the Media Resource Routing function block 308 in combination with the Media Streaming function block 304 is shown. The Media Streaming 304 controls the external interfaces like the IP sockets 300, 303 or a communication channel to an application 306. As already explained in FIG. 3, the required information is received by the Media Streaming Control Interface 301, delivering parameters such as IP addresses, sockets, Codec types and the like. The Resource Routing Module 308 uses a status list of available resources and channels to find requested resource types in the HMP resources 307 and at the Media Resource Board 305. Further, the Resource Routing Module 308 uses a list of priorities, if specified, to determine what resources are to be used first. Before activating a stream using a specific resource, the Resource Routing Module 308 confirms the availability of the resource by sending a resource reservation request to the corresponding component. A state machine tracks status such as the busy and free resources, the list of priorities, and requests to reserve specific resources with specific system performance consumption. Based on the status information, the Resource Routing Module 308 reroutes the communications accordingly.

In order to select activation of the host-based (software) DSP capabilities 307, the Routing function block 308 has both switches 310 move along arrows "a" that represent the bidirectional motion of the switches 310. It is to be appreciated that the IP Media Server 103 is not limited to have only one Media Resource Board 305.

Schematically, there are two ways that the switches can connect the stream. The first way is both switches being thrown to set up the soft DSP 307 in communication with the application 306 as shown in phantom line in FIG. 3A. The second way, as shown in solid line in FIG. 3A, is the switches being set to connect the media resource board 305 in communication with the application 306 via line 309. It is appreciated that a plurality of streams (e.g., layers or channels) as described above can be in operation simultaneously, using individual routes per stream.

Still referring to FIGS. 3 and 3A, the streaming system 10 also uses IP addresses, port numbers, Codec types (and other streaming attributes also part of typical SIP SDP headers). These streaming parameters are given, stream by stream, through the Media Streaming Control interface 301. Based on information coming from the Media Streaming Control interface 301, the media stream is terminated at an IP socket 300, and, after processing the stream, given to an application using the application communication channel 306, e.g., like the mentioned UMS application. As an alternative, the stream may be forwarded to another IP socket 303 towards another IP party, so that the Media Server 103 can also act as a transcoding proxy.

More generally, the media streaming of the IP Media Server 103 is controlled by any kind of signalling, for example SIP, H.323 or MRCP and the like. The Media Streaming Control Interface 301 controls streaming data such as the IP addresses, port numbers, Codec types and other streaming attributes that are typical parts of SIP SDP headers. The streaming parameters are processed, stream by stream, through the Media Streaming Control interface 301. Further, the IP Media Server 103 is not limited to having only a single type of Media Resource Board. The IP Media Server 103 is also not limited to routing single DSP resources such as purely a transcoding task between ITU-T G.711 and ITU-T G.729.

The IP Media Server 103 also processes entire sets of active features belonging to a specific stream run at the same location (e.g., a Resource Board 305) for stream latency reasons. As a result, the IP Media Server 103 can simulate devices like tone detectors, echo cancellers, transcoding tasks and (de-)modulation tasks as if a complete HMP software module were also running on the Media Resource Board 305. Also, the Media Resource Board can be a part of a Telephony Interface Board to access the PSTN, combining a Telephony Board and a DSP Resource Board into one PCB.

Figure 4:
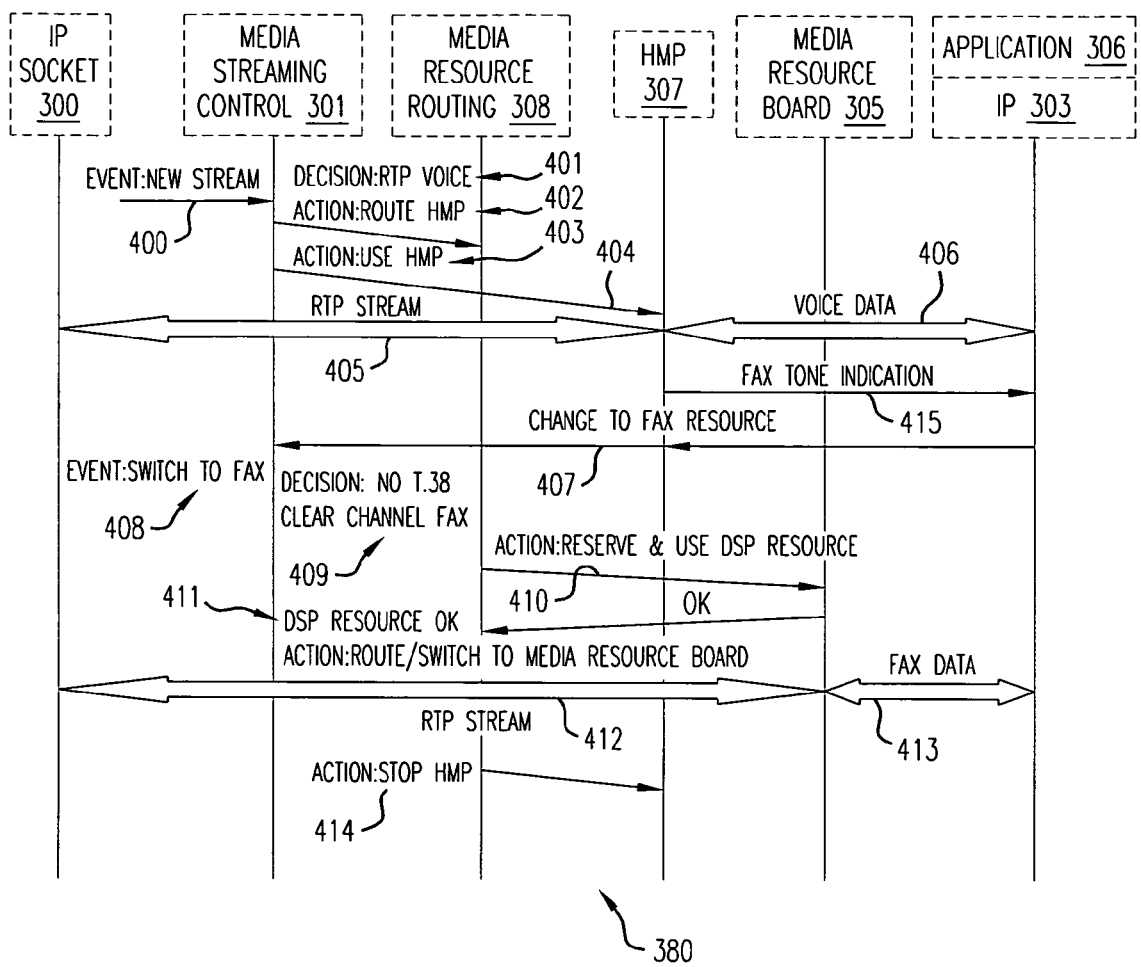
FIG. 4 is an example of a flowchart for a process illustrating automatic resource allocation and in particular allocating fax resources at the resource board.

Referring now to FIG. 4, there is illustrated a flowchart 380 depicting a call flow in accordance with the subject technology. The flowchart 380 illustrates the structure or the logic of the present technology, possibly as embodied in computer program software for execution on a server, computer, digital processor or microprocessor. Those skilled in the art will appreciate that the flowcharts illustrate the structures of the computer program code elements, including logic circuits on an integrated circuit, that function according to the present technology. As such, the present technology is practiced in its essential embodiment(s) by a machine component that renders the program code elements in a form that instructs a digital processing apparatus (e.g., a server) to perform a sequence of function step(s) corresponding to those shown in the flowchart.

In the flowchart 380, the call flow is set in a system 10, as shown in FIG. 3, including an IP Media Server 103 with Media Streaming Control 301 and related Media Resource Routing block 308.

The flowchart 380 has six entities or functional blocks referring to FIG. 3 as follows: the IP socket 300; Media Streaming Control 301; Media Resource Routing 308; the host-based DSP code HMP 307; the Media Resource Board 305; and an application 306 (e.g., a UMS application 306) along with the IP sockets 303.

Initially, the Media Streaming Control interface 301 receives a signal represented by arrow 400 from the IP socket 300. For example, the signal 400 is a new stream is to be established. Based on the information of the signal 400 (e.g., a RTP voice type 401), the Media Resource Routing 308 is set to rout the stream to the host-based DSP HMP 307, as represented by arrow 404. As a result of selecting the host-based HMP 307, the actions of routing 402 and using 403 the host-based soft DSP HMP 307 occurs (e.g., the host-based DSP HMP 307 is started). The signal passed along arrow 404 includes also all information about IP addresses, port numbers, Codec (typical SDP header data) and the like.

Next, an RTP stream is established between the IP socket 300 and the host-based DSP HMP 307, as represented by arrow 405. The host-based DSP HMP 307 transcodes the ITU-T RTP/G.711 stream into raw G.711 voice data (e.g., removes the RTP) to pass to an endpoint along arrow 406. For example, if the calling equipment is a G3 Fax machine, then the Fax Calling Tones are received by the system 10 through the RTP stream.

A tone detector inside the host-based DSP HMP 307 indicates a Fax Tone Indication to the UMS application 306 as represented by arrow 415. The UMS application 306 in turn sends a request to the host-based DSP HMP 307 that gets forwarded to the Media Streaming Control 301 as represented by arrow 407. The request 407 asks to switch the stream to Fax and the action 408 to switch to Fax occurs. Based on the information that no T.38 device is available (e.g., no license, disabled or not implemented by the IP peer), even if enough performance for a T.38 fax call at the host would remain, the system 10 decides that only Clear Channel Fax remains according to action 409.

In the case of only Clear Channel Fax remaining and the host-based DSP HMP 307 having no Clear Channel Fax modulation available, the system 10 can use the Fax resources of the Media Resource Board 305. The Media Resource Routing block 308 reserves and successfully starts the DSP resources of the Media Resource Board 305, as represented by arrow 410. The Media Resource Routing block 308 switches over the RTP steam to the Media Resource Board 305, as represented by action 411. The RTP stream is now received in clear channel mode (e.g., V.17 Fax modulated signals) by a DSP entity of the Media Resource Board 305, as represented by arrow 412. As represented by arrow 413, the Media Resource Board 305 demodulates the Clear Channel Fax signal and converts the Clear Channel Fax signal to the raw graphical Fax data format as adjusted during the module initialization (i.e., reserve and use DSP resource 410). Since the RTP stream 412 is established, the related HMP entity can be stopped, as represented by arrow 414.

Figure 5:
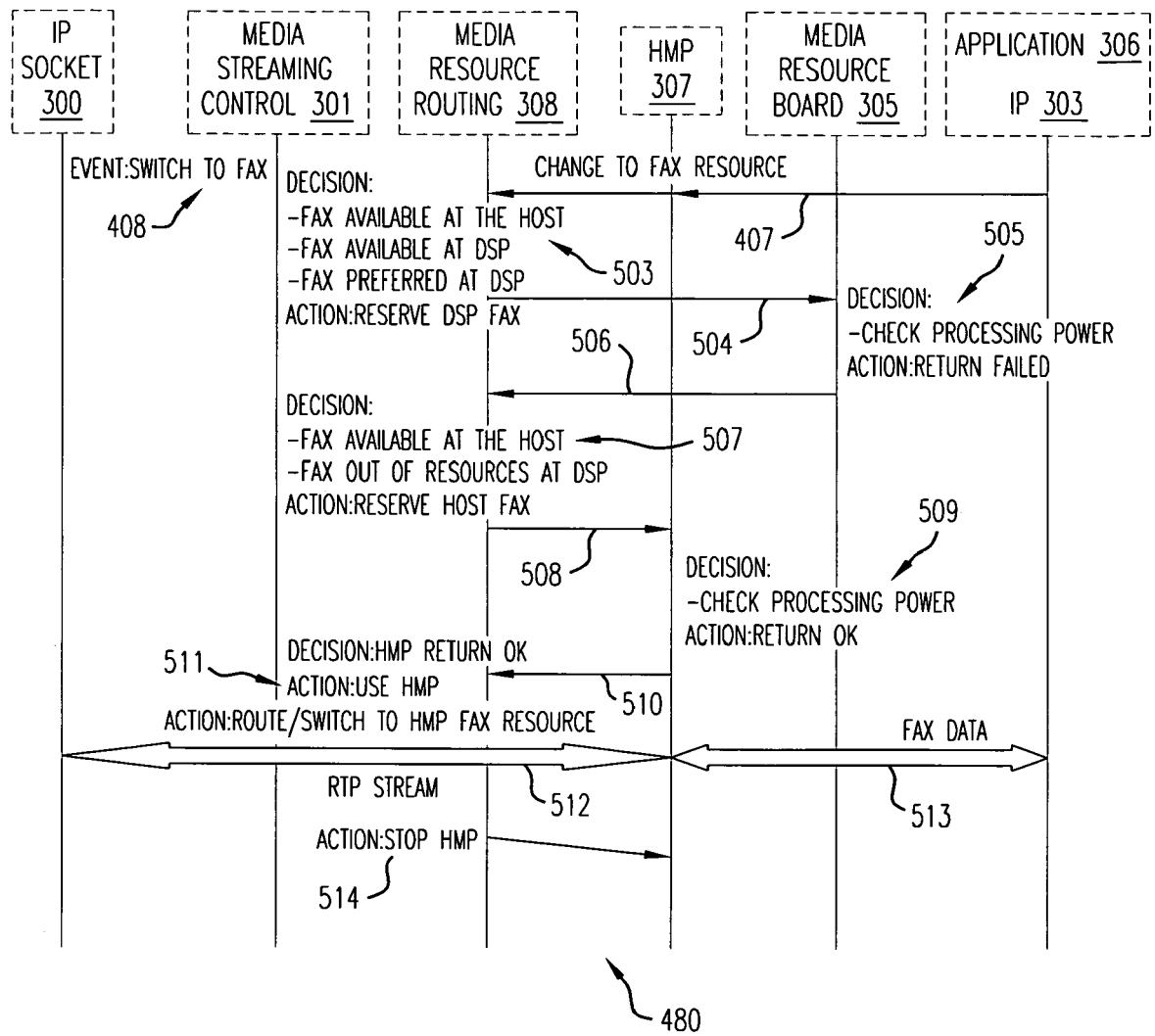
FIG. 5 is another example of a flowchart for process illustrating automatic resource allocation and in particular allocating fax resources at the host and at the resource board.

Referring to FIG. 5, it shows another example of a call flow or flowchart 480 in the IP Media Server 103 of FIG. 3. FIG. 5 consists of the same functional blocks as FIG. 4 and relates to the same situation as described in FIG. 4, except the fact that the HMP block 307 owns Fax resources and the Media Resource Board 305 as well, with a configured priority to consume all Fax resources of the Media Resource Board 305 first. Once the Media Resource Board resources are exhausted, the IP Media Server 103 continues to use the Fax resources at the host until the host processing power reaches a predefined upper limit. The following description is directed to the difference between the flowcharts 380, 480.

Again, event 408 requests switching to Fax, and the flowchart 480 begins at that point. The Media Resource Routing block 308 makes decision 503 to reserve the DSP resources of the Media Resource Board 305 because Fax resources are available at the host 307 and at the Media Resource Board 308. In such a case, the IP Media Server 103 is first to consume DSP resources of the Media Resource Board 308 as shown by arrow 504.

If the Media Resource Board 308 internally fails to allocate the requested resource or has insufficient resources, a decision 505 to return the failing DSP resource reservation occurs as shown by arrow 506. The Media Resource Routing block 308 makes the next decision 507, in which Fax resources are still available at the host 307 while the Media Resource Board 305 resources are exhausted. The Media Resource Routing 308 requests to reserve Fax resources at the host 307 as shown by arrow 508.

By action 509, the IP Media Server 103 checks the status of the available processing power. After the HMP 307 successfully checks the remaining host processing power, the IP Media Server 103 uses the Media Resource Routing block 308 to reserve the necessary resources. The Media Resource Routing module 308 switches over the RTP steam 512 to the HMP 307 by action 511. The RTP stream is now received in clear channel mode (including, for example, V.17 Fax modulated signals) by a Fax modem entity of the HMP 307 to establish an RTP stream as shown by arrow 512. As shown by arrow 513, the IP Media Server 103 demodulates the Clear Channel Fax signal and converts the Clear Channel Fax signal to the raw graphical Fax data format as adjusted during the action 510 (i.e., reserve and use HMP resource 511). Thus, the RTP stream 512 is established and the Fax can be processed in clear channel mode. Upon completion of the stream, the flowchart 480 stops as shown by action arrow 514.

It should be noted that a HMP software may be any host-based media processing software, like Dialogic HMP Software, Dialogic Diva softIP Software or Dialogic Brooktrout SR140 Fax Software (all available from the assignee of the subject application), or other software. Therefore, the description is not bound to a specific product or API.

Although the technology has been described with respect to currently preferred embodiments, those skilled in the art will readily appreciate that various changes and/or modifications can be made to the technology without departing from the spirit or scope of the technology as defined by the appended claims.

What is claimed is:

1. A Media Resource Routing module in communication with a Media Streaming module adapted for controlling external interfaces and a Media Resource Board comprising:
   a status list module indicating available resources of a Host Media Processing and channels on the Media Resource Board;
   a priority list for determining an order of consumption of the Host Media Processing and the channels on the Media Resource Board; and
   switches for routing communications based on data in the status list and the priority list,
   wherein if the status list indicates that one of the Host Media Processing and the channels on the Media Resource Board are exhausted, communications are routed to the other; and
   wherein the Host Media Processing and the Media Resource Board are facsimile resources and the communications are facsimile media streams.

2. A Media Resource Routing module as recited in claim 1, further comprising a confirmation module for reserving availability of the resources and channels by sending a resource reservation request to the Host Media Processing and Media Resource Board, respectively, prior to activation attempts, if available, the respective resources and channels are reserved.

3. A Media Resource Routing module as recited in claim 1, wherein the switches are software.

4. A Media Resource Routing module as recited in claim 1, wherein the status list includes: i) a location of the resource and channels; ii) a task related performance consumption value, wherein high performance consumption value tasks are run on the Media Resource Board while low performance consumption tasks are run at the Host Media Processing; iii) remaining Host Media Processing CPU capacity; and v) a number of available resources at the Host Media Processing and at the Media Resource Board.

5. A Media Resource Routing module as recited in claim 1, wherein the switches use inactive DSP-enabled channels of the Media Resource Board for non-DSP related calls if all available channels of the Host Media Processing are used.

6. A Media Resource Routing module as recited in claim 1, wherein the resources of the Media Resource Board resources are reserved for DSP dedicated usage only.

7. A Media Resource Routing module as recited in claim 1, wherein during a call, a call characteristic may change such that the switches would reroute the call from the Host Media Processor to the Media Resource Board, and vice versa.

8. A server for facilitating communication connections in a system, wherein the server allocates resources to allow communication with endpoints via Internet Protocol (IP) sockets, and wherein the server comprises:

(a) at least one Media Resource Board for handling media streams;
(b) a memory storing instruction sets for Host Media Processing and data related to a plurality of application modules; and
(c) a host processor for running the instruction set, the host processor being in communication with the memory and the at least one Media Resource Board, wherein the host processor is operative to:
 (i) run the plurality of application modules for operating instruction sets associated with respective protocols;
 (ii) run a Host Media Processing software module for hardware and software technology housekeeping and coordination tasks, and abstracting a pool of channels; and
 (iii) run a Media Resource Routing module for selectively allocating resources of the at least one Media Resource Board and the Host Media Processing software module to efficiently route communication to endpoints,
wherein resources of the at least one Media Resource Board are configured according to a priority so that the resources of the at least one Media Resource Board are consumed first and once resources of the at least one Media Resource Board are exhausted, the Media Resource Routing module directs future media streams to the Host Media Processing, and
wherein the resources are facsimile resources and the future media streams are facsimile media streams.

9. A server as recited in claim 8, wherein if a call characteristic changes during the call, the Media Resource Routing module automatically reroutes the call so that available resources are efficiently used.

10. A method for utilizing resources in a media communication system, the communication system having a Media Resource Routing module for controlling communication to a Host Media Processing and a Media Resource Board, the method comprising the steps of:
 receiving a signal to establish a media stream;
 determining a routing of the media stream based on data in the signal, wherein the Media Resource Routing module selects the routing from using the Host Media Processing or the Media Resource Board; and
 establishing the media stream according to the routing,
 wherein resources of the Host Media Processing are configured according to a priority so that the resources of the Host Media Processing are consumed first, and once the resources of the Media Resource Board are exhausted, the Media Resource Routing module continues to use the resources at the Host Media Processing until a processing power of the Host Media Processing reaches a predefined upper limit, and
 wherein the certain resources are facsimile resources and the future related media streams are facsimile media streams.

11. A method as recited in claim 10, wherein the media stream is a facsimile and if the Host Media Processing has insufficient resources to handle the media stream, the Media Resource Routing module establishes the media stream using the Media Resource Board.

12. A method as recited in claim 10, wherein the Media Resource Routing module includes a status list module indicating available resources of the Host Media Processing and available channels on the Media Resource Board and switches for routing communications based on data in the status list.

13. A method as recited in claim 10, wherein the media communication system includes IP sockets for establishing communication and at least one software application for processing the media stream.

14. A method as recited in claim 10, wherein the media communication system is adapted and configured for use with a Voice over Internet Protocol (VoIP) system.

15. A method as recited in claim 10, further comprising the steps of: routing the signal to the Media Resource Board; and
 if the Media Resource Board internally fails to establish the media stream, rerouting the signal to the Host Media Processing.

16. A method for utilizing resources in a media communication system, the communication system having a Media Resource Routing module for controlling communication to a Host Media Processing and a Media Resource Board, the method comprising the steps of:
 receiving a signal to establish a media stream;
 determining a routing of the media stream based on data in the signal, wherein the Media Resource Routing module selects the routing from using the Host Media Processing or the Media Resource Board; and
 establishing the media stream according to the routing,
 wherein the resources of the Media Resource Board are configured according to a priority so that the resources of the Media Resource Board are consumed first and once the resources of the Media Resource Board are exhausted, the Media Resource Routing module directs future media streams to the Host Media Processing, and
 wherein the resources are facsimile resources and the future media streams are facsimile media streams.

* * * * *